United States Patent
Georgin et al.

(10) Patent No.: US 10,131,421 B2
(45) Date of Patent: Nov. 20, 2018

(54) LOCKED WHEEL EXTENSION PROTECTION IN BRAKE CONTROL SYSTEMS

(71) Applicant: Goodrich Corporation, Charlotte, NC (US)

(72) Inventors: Mark Georgin, Dayton, OH (US); Richard Paul Metzger, Jr., Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 365 days.

(21) Appl. No.: 14/979,198

(22) Filed: Dec. 22, 2015

(65) Prior Publication Data

US 2017/0174331 A1 Jun. 22, 2017

(51) Int. Cl.
| | |
|---|---|
| *B64C 25/42* | (2006.01) |
| *B60T 8/1761* | (2006.01) |
| *B60T 8/171* | (2006.01) |
| *B60T 8/17* | (2006.01) |
| *B64C 25/34* | (2006.01) |
| *B60T 8/88* | (2006.01) |

(52) U.S. Cl.
CPC ............... *B64C 25/42* (2013.01); *B60T 8/171* (2013.01); *B60T 8/1703* (2013.01); *B60T 8/17616* (2013.01); *B60T 8/885* (2013.01); *B64C 25/34* (2013.01); *B60T 2270/402* (2013.01)

(58) Field of Classification Search
CPC ....... B64C 25/42; B64C 25/34; B60T 8/1703; B60T 8/171; B60T 8/17616; B60T 8/885; B60T 2270/402
See application file for complete search history.

(56) References Cited

U.S. PATENT DOCUMENTS

| | | | |
|---|---|---|---|
| 2,850,121 A * | 9/1958 | Curl ..................... | B60T 8/1703 188/181 A |
| 2,869,807 A * | 1/1959 | Kassel ................. | B60T 8/1703 188/181 A |
| 2,957,658 A * | 10/1960 | Nichols ................ | B60T 8/1703 244/111 |

(Continued)

FOREIGN PATENT DOCUMENTS

| | | | |
|---|---|---|---|
| GB | 1206153 A * | 9/1970 | ............... B60L 3/10 |
| GB | 2463752 | 3/2010 | |

OTHER PUBLICATIONS

Extended European Search Report dated May 18, 2017 in European Application No. 16204830.0.

*Primary Examiner* — Jelani A Smith
*Assistant Examiner* — Donald J Wallace
(74) *Attorney, Agent, or Firm* — Snell & Wilmer L.L.P.

(57) ABSTRACT

A method for controlling brakes is provided. The method may include the steps of detecting an aircraft speed, determining the aircraft speed is within a range from an antiskid-dropout speed to a locked-wheel-protection-engagement speed, and determining an input of a pressure controller has a value less than a pressure maximum threshold. A current command that is output from the pressure controller may be detected at or above a threshold value. The states of the pressure controller and pressure controller input may be reset in response to the current command being at or above the threshold value for a predetermined duration.

20 Claims, 3 Drawing Sheets

(56) References Cited

U.S. PATENT DOCUMENTS

| | | | |
|---|---|---|---|
| 5,505,531 A * | 4/1996 | Griffith | B60T 8/00 |
| | | | 188/181 A |
| 5,918,951 A * | 7/1999 | Rudd, III | B60T 8/17616 |
| | | | 188/181 T |
| 6,079,799 A | 6/2000 | Sawada et al. | |
| 6,132,016 A * | 10/2000 | Salamat | B60T 8/1703 |
| | | | 303/112 |
| 6,142,585 A * | 11/2000 | Gowan | B60T 8/00 |
| | | | 303/126 |
| RE44,677 E | 12/2013 | Campau et al. | |
| 9,771,057 B2 * | 9/2017 | Georgin | B60T 8/1703 |
| 2005/0001474 A1 | 1/2005 | Zierolf | |
| 2005/0040286 A1 * | 2/2005 | Radford | B60T 8/1703 |
| | | | 244/111 |
| 2006/0158032 A1 | 7/2006 | Miyazaki et al. | |
| 2008/0234909 A1 * | 9/2008 | Iwasaki | B60T 1/10 |
| | | | 701/70 |
| 2010/0276989 A1 * | 11/2010 | Metzger, Jr. | B60T 8/00 |
| | | | 303/20 |
| 2014/0095044 A1 | 4/2014 | Kikawa et al. | |
| 2015/0088371 A1 * | 3/2015 | Kanemori | B60T 8/1703 |
| | | | 701/33.9 |
| 2017/0183087 A1 * | 6/2017 | Georgin | B60T 8/1703 |

\* cited by examiner

LOCKED WHEEL EXTENSION PROTECTION IN BRAKE CONTROL SYSTEMS

FIELD

The present disclosure relates to aircraft braking systems. In particular, the disclosure relates to systems and methods for antiskid protection in aircraft at taxiing speeds.

BACKGROUND

Aircraft brake systems typically employ a series of friction disks compressed together to stop the aircraft. The braking systems may limit skid conditions using locked wheel functionality and antiskid algorithms. At speeds below approximately 30 knots, the locked wheel functionality may not be effective. The locked wheel functionality may use reference wheel speeds to detect and mitigate skids, but the wheel speed techniques may be less effective at lower speeds. Thus, at taxiing speeds of approximately 10 knots to approximately 30 knots, the aircraft may rely on the antiskid algorithm rather than the locked wheel functionality.

The antiskid algorithm may rely in part on pressure sensors to determine the braking pressure being applied at the wheels. However, the pressure sensor may fail with a reading in a normal operating range and thus go undetected. At the boundary condition, where the pressure sensor fails undetected to a no-pressure state (e.g., signaling a measurement of 0 psi or 0 Pa) and brake pressure is actually being applied, the antiskid function may not be able to release the pressure to zero using the pressure controller.

SUMMARY

A method for controlling brakes may include the steps of detecting an aircraft speed, determining the aircraft speed is within a range from an antiskid-dropout speed to a locked-wheel-protection-engagement speed, and determining an input of a pressure controller has a value less than a pressure maximum threshold. A current command that is output from the pressure controller may be detected at or above a threshold value. A state of the pressure controller and pressure controller input may be reset in response to the current command being at or above the threshold value for a predetermined duration.

In various embodiments, the predetermined duration may be determined to have elapsed while the current command has been maintained at or above the threshold. Brake pressure may be reduced in response to the current command being at or above the threshold value for a predetermined duration. The antiskid-dropout speed may be 10 knots and the locked-wheel-protection-engagement speed may be 30 knots. The threshold value may correspond to a maximum current command value that the pressure controller may output. The current command that is output by the pressure controller may be generated based on a relationship between the input of the pressure controller and the current command. The current command may range from 2 mA to 30 mA. The BCU may switch to an open-loop control in response to a pressure sensor failure. The input of the pressure controller may include a pressure command ranging from 0 psi to 3000 psi. The BCU may set the input of the pressure controller to a minimum value selected from a pilot desired pressure or an antiskid control unit desired pressure.

A brake control system may include a brake control unit (BCU) comprising a pressure control unit (PK). The PK may be configured to receive a pressure command and output a current command in response to the pressure command. The BCU may be configured to reset the states of the PK and the input in response to detecting the current command at or above a threshold value for a predetermined duration. The system may also include an aircraft brake having a brake control device configured to apply a force in response to the current command.

In various embodiments, the BCU may comprise a brake control executive (BKX) configured to set the pressure command to a minimum value selected from a pilot desired pressure and an antiskid control unit desired pressure. The threshold value may be set at or below the maximum current command value that the PK outputs. The BCU may be configured to switch to an open-loop control in response to a signal from a failed pressure sensor. The signal from the failed pressure sensor may comprise a signal within an expected range.

A brake control system may include a processor, a tangible, non-transitory memory configured to communicate with the processor, the tangible, non-transitory memory having instructions stored thereon that, in response to execution by a processor, cause a brake control unit (BCU) to perform operations. The operations may include determining an aircraft speed is within a range from an antiskid-dropout speed to a locked-wheel-protection-engagement speed, determining an input of a pressure controller has a value less than a pressure maximum threshold, and determining a current command output is at or above a threshold value for a predetermined duration. The BCU may reset the states of the pressure controller and pressure controller input in response to the current command being at or above the threshold value for the predetermined duration.

In various embodiments, the threshold value may correspond to a maximum current command value. The antiskid-dropout speed may be 10 knots and the locked-wheel-protection-engagement speed may be 30 knots. The BCU may generate the current command output by the pressure controller based on a relationship between the input of the pressure controller and the current command. The BCU may switch to an open-loop control in response to a pressure sensor failure. The BCU may also set the input of the pressure controller to a minimum value selected from a pilot desired pressure or an antiskid control unit desired pressure.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
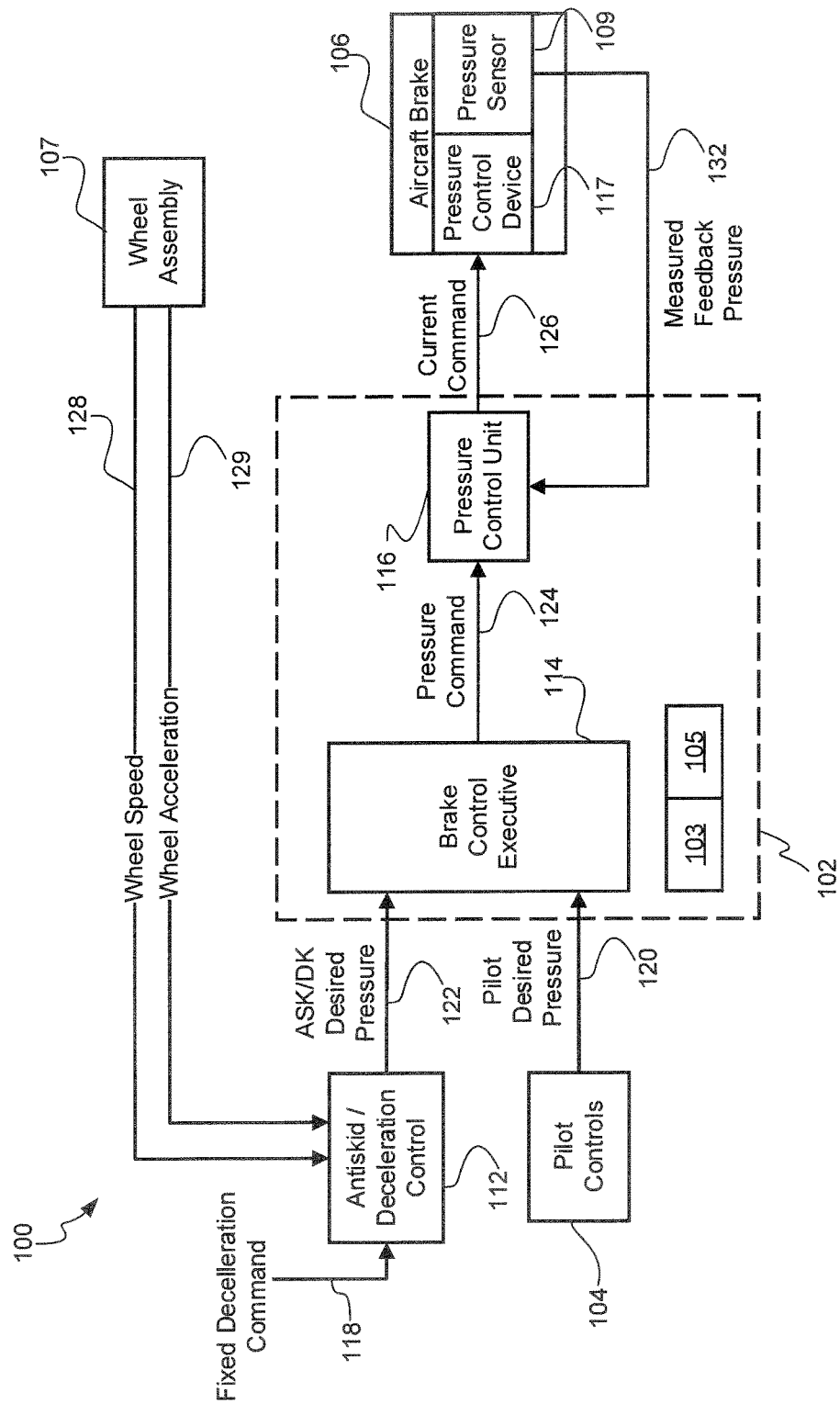
FIG. 1 illustrates a brake system on an aircraft for providing antiskid protection at low speeds, in accordance with various embodiments.

Referring to FIG. 1, system 100 for aircraft braking may provide antiskid protection by controlling brake 106. The system 100 includes a brake control unit (BCU) 102, a set of pilot controls 104, the brake 106, and a wheel assembly 107.

In various embodiments, brake 106 may apply stopping force in response to pressure applied by brake control device 117. Brake control device 117 may be an electronically controlled servo configured to actuate a hydraulic valve and thereby control the stopping force generated by brake 106. Brake control device 117 may receive an instruction to apply pressure to one or more friction disks of the brake 106. In response, the brake control device 117 may open and/or close a valve to varying degrees to adjust the pressure applied by brake 106, thus decelerating the wheel assembly 107 in a controlled manner. This pressure may be referred to as a braking pressure.

In various embodiments, Brake control device 117 may also be an electromechanical brake actuator configured to actuate a puck against the brake stack in response to a current and/or voltage applied to the actuator. The force of the puck compressing the brake stack provides braking pressure to stop wheel assembly 107.

In various embodiments, the BCU 102 may include one or more processors 103 and one or more tangible, non-transitory memories 105 and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination of processing logic.

In various embodiments, a pilot may control brake 106 using pilot controls 104. For example, the BCU 102 may receive a pilot desired pressure value 120 that corresponds to a desired amount of braking. The pilot desired pressure value 120 may be generated or altered in response to a depression of a brake pedal within a cockpit of the aircraft. The pilot desired pressure value 120 may also be generated or altered in response to an instruction to retract landing gear of the aircraft.

In various embodiments, brake 106 may also be controlled by an antiskid/deceleration control unit 112 (ASK/DK) that is part of a brake control algorithm unit. The brake control algorithm unit may include the ASK/DK 112, the brake control executive 114 (BKX), and the pressure control 116 (PK). The brake control algorithm is illustrated as a component of BCU 102, but may also be implemented outside of BCU 102 and operate in concert with BCU 102. In that regard, the BCU may include one or more of the ASK/DK 112, BKX 114, and/or PK 112. Each of the components may also be implemented outside of BCU 102.

In various embodiments, ASK/DK 112 may receive a fixed deceleration command value 118 from another unit of the BCU 102, a filtered wheel speed value 128 from the wheel assembly 107, and a filtered wheel acceleration value 129 from the wheel assembly 107. The fixed deceleration command value 118 may be a fixed acceleration number such as, for example, 5.8 m/s$^2$ or any acceleration number suitable to a braking application as determined based on aircraft weight, speeds, and braking capability. The ASK/DK 112 can output a desired pressure command value 122 corresponding to a desired amount of pressure to be applied to the brake 106 based on the fixed deceleration command value 118, the filtered wheel speed value 128, and the filtered wheel acceleration value 129. The desired pressure command value may be based on an algorithm for reducing the likelihood of the aircraft skidding and/or based on an automatic deceleration algorithm.

The BKX 114 receives both the pilot desired pressure value 120 and the desired pressure command value 122 and issues a pressure command value 124 based on the pilot desired pressure value 120 and the desired pressure command value 122. In various embodiments, the pressure command value 124 may be equal to the minimum value of the desired pressure command value 122 and the pilot desired pressure value 120. The pressure command value 124 corresponds to a desired amount of pressure to be applied to the brake 106.

The PK 116 may receive the pressure command value 124 and may convert the pressure command value 124 into a current command value 126. Current command value 126 may be a current measured in Amperes such as, for example, a current from the range of 2 mA-30 mA. The current command value 126 may be received by the brake control device 117 of the brake 106. Brake control device 117 may be designed to convert the current command value 126 into a pressure. The pressure may be applied to one or more disks of a disk brake system of the brake 106. The relationship between received current of brake control device 117 and the amount of pressure applied may generally be linear. For example, in various embodiments the relationship may be described as $$\text{current} = \frac{\text{pressure}}{151.2 \text{ psi}/ma} + 5.5 \text{ ma}.$$

In various embodiments, PK 116 may use the predetermined relationship between current and pressure to determine the current command value 126 based on the known pressure command value 124.

In various embodiments, PK 116 may also use another predetermined relationship for determining the current command value 126 based on the pressure command value 124. The PK 116 may also determine the current command value 126 based on a detected pressure value 132 corresponding to a detected pressure applied to the one or more disks of the brake 106. In that regard, the determination of the current command value 126 may be based on a feedback system such that the current command value 126 is adjusted in an attempt to equalize the detected pressure value 132 and the pressure command value 124 based on the aforementioned relationship.

In various embodiments, brake 106 may include a pressure sensor 109 for detecting the pressure applied by the brake control device 117. The pressure sensor 109 may transmit the detected pressure value 132 to PK 116 for feedback control of brake control device 117. In embodiments using an electromechanical actuator for brake control device 117, pressure sensor 109 may comprise a force sensor in the form of a load cell output and/or a force estimation.

In various embodiments, the system 100 may extend locked wheel protection between the antiskid dropout speed (ADS) and the locked wheel protection engagement speed (LWS). The ADS may be the speed under which antiskid becomes disabled because of wheel speed sensor resolution. The LWS may be the speed below which the normal locked wheel function is disabled. For example, the antiskid dropout speed may be 10 knots and the locked wheel protection engagement speed may be 30 knots. The antiskid dropout speed may also be 5 knots and the locked wheel protection engagement speed may be 35 knots. The antiskid dropout speed may further be 3 knots and the locked wheel protection engagement speed may be 40 knots. The speed thresholds may be determined with variation to the speeds based on the weight, speeds, wheel size, etc. of an aircraft.

Figure 2:
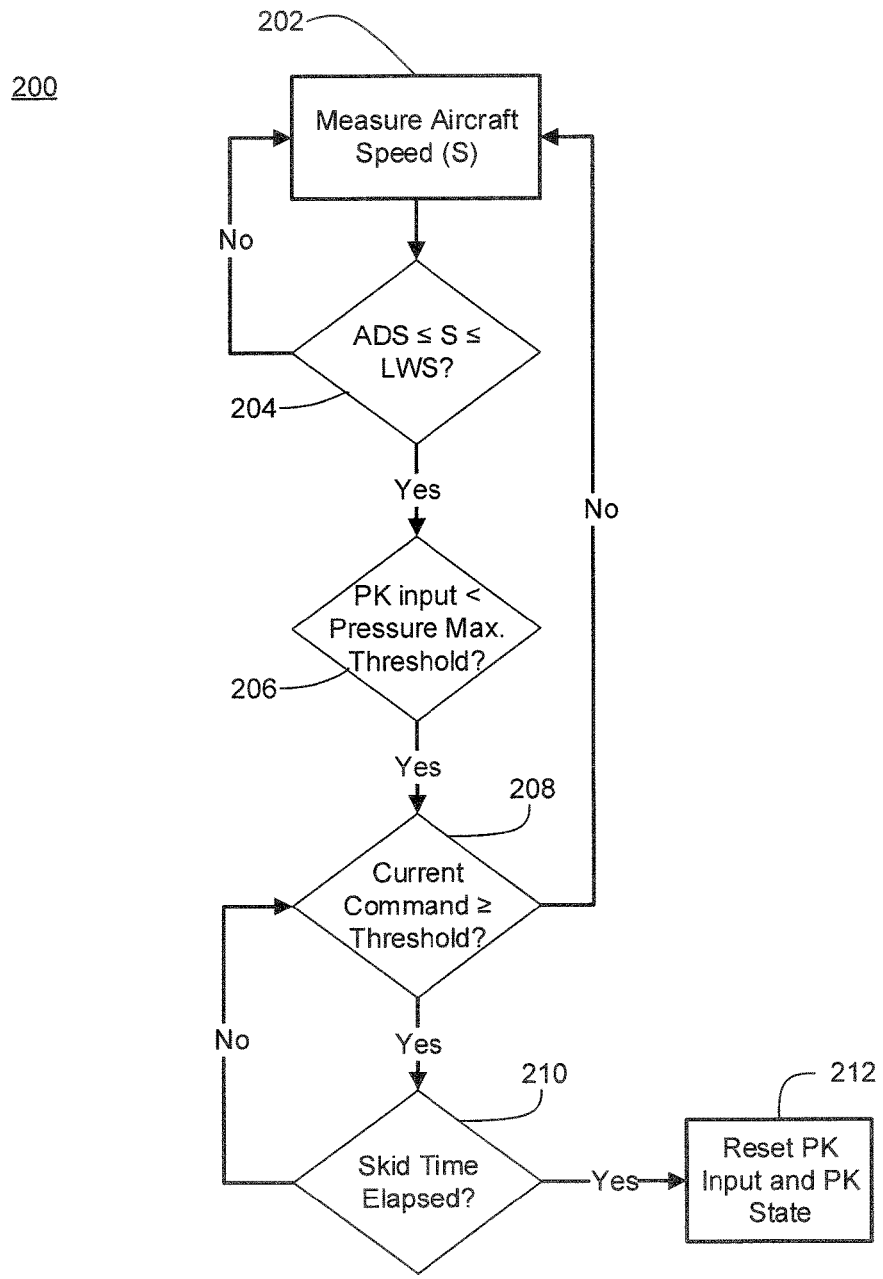
FIG. 2 illustrates a flowchart for providing antiskid protection at low speeds using a brake system, in accordance with various embodiments.

With reference to FIG. 2, a flow diagram 200 is shown for providing antiskid protection at low speeds using system 100. BCU 102 may measure the aircraft speed S (Block 202). Speed S may be measured using wheel speed transducers in wheel assembly 107 to transmit filtered wheel speed value 128 and filtered wheel acceleration value 129 measurements to BCU 102.

In various embodiments, BCU 102 may check whether the aircraft speed S is between ADS and LWS (ADS≤S≤LWS?) in Block 204. If aircraft speed is between ADS and LWS, BCU 102 may check whether PK 116 input has a value less than a pressure maximum threshold (Block 206). PK 116 input may have a value less than a pressure maximum threshold due to a pedal command, antiskid command, gear retract command, autobrake command, and/or any command requesting braking. If the aircraft speed is not between ADS and LWS, the BCU 102 may continue monitoring and/or measuring aircraft speed.

In various embodiments, in response to detecting a PK input value less than a pressure maximum threshold, BCU 102 may check whether a threshold current command is being output by PK 116 (Block 208). The threshold current command may be, for example, when current command value 126 is equal to the maximum current output of PK 116. If the current command value 126 is less than the threshold value, BCU 102 may continue measuring and/or monitoring aircraft speed.

In various embodiments, BCU 102 may check whether the skid time $T_S$ has elapsed (Block 210) in response to the current command reaching and/or exceeded a predetermined threshold value (such as max current). Skid time limit $T_S$ may be set to a suitable duration such as, for example, 300 milliseconds, 500 milliseconds, 1 second, or any other desired duration after which further skid time is undesirable. In response to detecting current command value 126 at or above a threshold value for a duration greater than or equal to skid time limit $T_S$, BCU 102 may reset the pressure controller command input and pressure controller states (Block 212). Resetting the pressure controller command input and pressure controller states is equivalent to force the current to the brake control device 117 back to zero.

In various embodiments, by resetting the pressure controller command input and pressure controller states, the current to brake control device 117 may be forced to zero. Pressure to brake 106 is thereby relieved so that the wheel mechanically coupled to brake 106 may spin up to rolling speed. The pressure controller and command may be maintained in the reset state for a tunable reset time in order to ensure that the reset of the pressure controller allows enough time for the wheel to spin up. This reset time could be set to, for example, 500 ms or 1 s. The BCU may then report a failure condition, which indicates that system 100 is performing safely but with degraded performance. In response to a failure condition, the system 100 operation switches to open loop pressure control and ignores detected pressure value 132 that is otherwise used as feedback. At that point, the nominal antiskid protection may resume and the locked wheel extension protection de-activates. Nominal antiskid protection may operate to limit skidding while effectuating a stop.

In various embodiments, when the brake pressure sensor is functioning properly, the current commanded to brake control device 117 through the linear pressure controller may not reach a max current command when the pressure controller input value is less than a pressure maximum threshold. Therefore, the system performs with normal antiskid protection at such lower speeds and the locked wheel extension protection does not activate.

Figure 3:
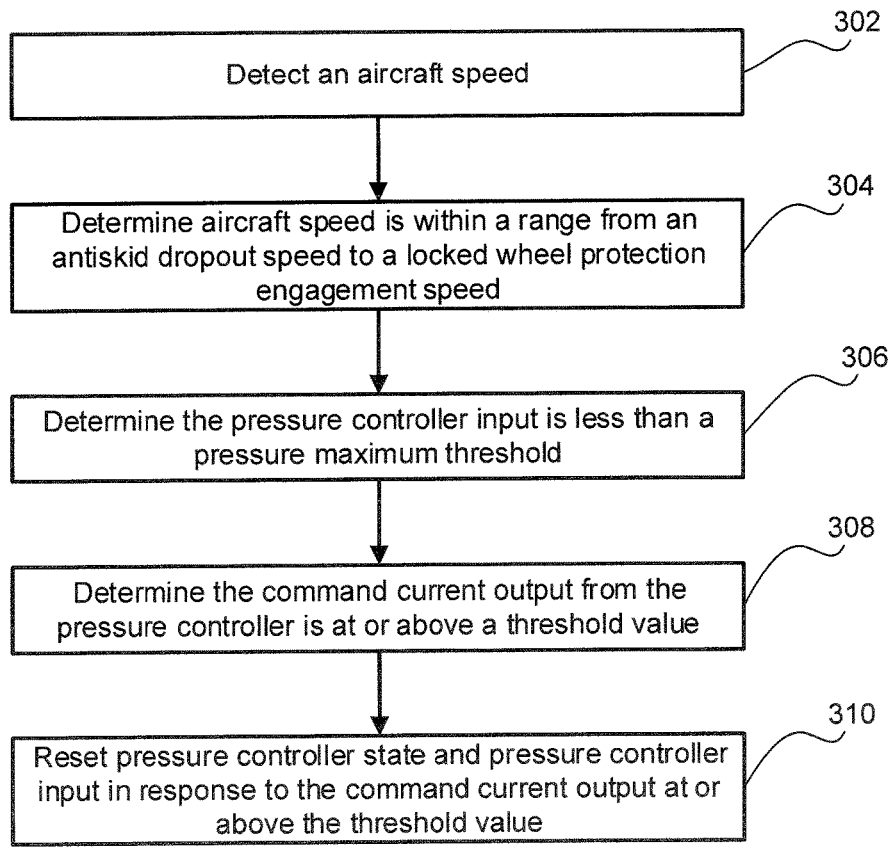
FIG. 3 illustrates a process for providing antiskid protection at low speeds using a brake system, in accordance with various embodiments.

With reference to FIGS. 1 and 3, a process 300 for providing antiskid protection at low speeds using a brake control system is shown, in accordance with various embodiments. Process 300 may be similar to or the same as the process depicted by flow diagram 200, but presented in a linear manner. The brake control system may detect an aircraft speed (Block 302). The aircraft speed may be determined, for example, from the angular velocity and size of a wheel assembly 107. The brake control system may determine the aircraft speed is within the range from an antiskid dropout speed to a locked wheel protection engagement speed (Block 304). The ADS and LWS may be similar to the speeds described above, with the range selected to include speeds where the antiskid protection of the present disclosure may be beneficial.

In various embodiments, the brake control system may determine the PK 116 input is less than a pressure maximum threshold (Block 306). The PK input may be measured in a current and/or voltage and may or may not be converted to a resultant pressure expected at aircraft brake 106. The brake control system may determine the command current output from the PK 116 is at or above a threshold (Block 308). In response to the command current output being at or above the threshold value, the brake control system may reset the PK 116 state and input (Block 310), as described above with reference to FIGS. 1 and 2.

By way of example and referring to FIG. 1, assume that the brake pressure sensor fails at a constant value of 0 psi and the aircraft is taxiing between ADS and LWS speeds. The pilot presses the pedals asking for 500 psi of braking pressure using pilot controls 104. The PK 116 carries out the requested command. However, because the pressure feedback (i.e., detected pressure value 132) is zero due to a failed pressure sensor 109, PK 116 rapidly escalates output to the maximum current in order to raise pressure in the brake (from the erroneously signaled 0 psi). After skid time limit has elapsed, the locked wheel extension protection activates and releases pressure to the brake. After the reset time has elapsed, a failure condition is set and reported. At that point, open loop pressure control becomes active, nominal antiskid takes over and locked wheel extension protection terminates.

Referring now to FIG. 1, systems 100 may control the brake 106 using an open loop control method in response to a pressure sensor failure. As a result, the PK 116 may only determine the current command value 126 based on the pressure command. This tends to reduce reliance on incorrect pressure information received from the brake 106 from a failed pressure sensor when the failure may have otherwise gone undetected. As a result, antiskid protection may be extended to lower aircraft speeds such as taxiing speeds by using a PK downstream of braking commands to improve system response.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for controlling brakes, comprising:
   detecting, by a brake control unit (BCU), an aircraft speed;
   determining, by the BCU, the aircraft speed is within a range from an antiskid-dropout speed to a locked-wheel-protection-engagement speed;
   determining, by the BCU, an input of a pressure controller has a value less than a pressure maximum threshold;
   determining, by the BCU, a current command that is output from the pressure controller is at least one of at or above a threshold value; and
   resetting, by the BCU, a state of the pressure controller and the input of the pressure controller in response to the current command being at least one of at or above the threshold value for a predetermined duration.

2. The method of claim 1, further comprising determining, by the BCU, that the predetermined duration has elapsed while the current command has been maintained in at least one of at or above the threshold value.

3. The method of claim 1, further comprising reducing, by the BCU, a brake pressure in response to the current command being at least one of at or above the threshold value for the predetermined duration.

4. The method of claim 1, wherein the antiskid-dropout speed is 10 knots and the locked-wheel-protection-engagement speed is 30 knots.

5. The method of claim 1, wherein the threshold value is a maximum current command value.

6. The method of claim 1, further comprising generating, by the BCU, the current command that is output by the pressure controller based on a relationship between the input of the pressure controller and the current command.

7. The method of claim 1, further comprising switching, by the BCU, to an open-loop control in response to a pressure sensor failure.

8. The method of claim 1, wherein the current command ranges from 2 mA to 30 mA.

9. The method of claim 1, wherein the input of the pressure controller comprises a pressure command ranging from 0 psi to 3000 psi.

10. The method of claim 1, further comprising setting, by the BCU, the input of the pressure controller to a minimum value selected from a pilot desired pressure or an antiskid control unit desired pressure.

11. A brake control system, comprising:
    a brake control unit (BCU) comprising a pressure control unit (PK), wherein the BCU is configured to detect an aircraft speed and determine whether the aircraft speed is within a range from an antiskid-dropout speed to a locked-wheel-protection-engagement speed,
    wherein the BCU is configured to determine whether an input of the PK has a value less than a pressure maximum threshold, wherein the PK is configured to receive a pressure command and output a current command in response to the pressure command, wherein the BCU is configured to reset a state of the PK and the pressure command in response to detecting the current command being at least one of at or above a threshold value for a predetermined duration; and an aircraft brake having a brake control device configured to apply a force in response to the current command.

12. The brake control system of claim 11, wherein the BCU comprises a brake control executive (BKX) configured to set the pressure command to a minimum value selected from a pilot desired pressure and an antiskid control unit desired pressure.

13. The brake control system of claim 11, wherein BCU is configured to switch to an open-loop control in response to a signal from a failed pressure sensor.

14. The brake control system of claim 13, wherein the signal from the failed pressure sensor is within an expected range.

15. A brake control system, comprising:

a processor;

a tangible, non-transitory memory configured to communicate with the processor, the tangible, non-transitory memory having instructions stored thereon that, in response to execution by the processor, cause a brake control unit (BCU) to perform operations comprising:

determining, by the BCU, an aircraft speed is within a range from an antiskid-dropout speed to a locked-wheel-protection-engagement speed;

determining, by the BCU, an input of a pressure controller has a value less than a pressure maximum threshold;

determining, by the BCU, a current command that is output from the pressure controller is at or above a threshold value for a predetermined duration; and resetting, by the BCU, a state of the pressure controller and the input of the pressure controller in response to the current command being at least one of at or above the threshold value for the predetermined duration.

16. The brake control system of claim 15, wherein the threshold value is a maximum current command value.

17. The brake control system of claim 15, wherein the antiskid-dropout speed is 10 knots and the locked-wheel-protection-engagement speed is 30 knots.

18. The brake control system of claim 15, further comprising generating, by the BCU, the current command that is output by the pressure controller based on a relationship between the input of the pressure controller and the current command.

19. The brake control system of claim 15, further comprising switching, by the BCU, to an open-loop control in response to a pressure sensor failure.

20. The brake control system of claim 15, further comprising setting, by the BCU, the input of the pressure controller to a minimum value selected from at least one of a pilot desired pressure or an antiskid control unit desired pressure.

* * * * *